VIDEO QUANTIZING SYSTEM

Filed March 29, 1965 4 Sheets-Sheet 1

INVENTORS
MAURICE R. BARTZ
ROGER E. OLSON
NORMAN S. STOCKDALE

BY Francis V. Giolma
ATTORNEY

United States Patent Office 3,415,950
Patented Dec. 10, 1968

3,415,950
VIDEO QUANTIZING SYSTEM
Maurice R. Bartz, Roger E. Olson, and Norman S. Stockdale, Rochester, Minn., assignors to International Business Machines Corporation, Armonk, N.Y., a corporation of New York
Filed Mar. 29, 1965, Ser. No. 443,227
10 Claims. (Cl. 178—7.1)

This invention relates generally to character recognition, and it has reference in particular to a video quantizing system for use with document scanning apparatus.

Generally stated it is an object of the present invention to provide for changing the level at which a video signal is clipped, depending on whether or not information is present in the video signal.

More specifically it is an object of this invention to provide in a video quantizing system for selectively changing a clipping level of a voltage discriminator between two values in response to whether a character is detected or not.

Another object of this invention is to provide for selectively using a tapped delay line and a peak detector for determining the clipping levels of a voltage discriminator in a video quantizing system.

Yet another object of this invention is to provide for using a controlled switch for selectively determining which of two signals is to control the clipping level in a voltage discriminator.

It is also an object of the present invention to use both short and long-time storage devices in a video quantizing system wherein two different clipping levels are used in a voltage discriminator, depending upon whether or not a video signal is present.

Still another object of this invention is to provide for using short and long-time storage means in determining the clipping level of a voltage discriminator, and for using feedback from the long-time storage means to influence the short-time storage means clipping level.

Yet another object of this invention is to provide in a quantizing circuit for using a peak detector and a tapped delay line for providing different clipping levels for clipping a video signal based on an average level of the video signal.

Another important object of this invention is to provide for utilizing a peak detector and a delay line to establish clipping levels for a voltage discriminator in a quantizing system, and for switching from the peak detector level to the delay line level under the control of a delay circuit a predetermined time after the discriminator ceases to detect black in the video signal.

In accordance with one embodiment of the invention, a phosphor noise corrected video signal is applied to a peak detector, a tapped delay line, and a voltage discriminator. The integrated signal from the delay line is applied as one input to an analog switch, the other input being from the peak detector through a short-time storage device. The switch is connected to apply one or the other of these input signals to provide the clipping level for the discriminator, depending on the output of the discriminator. The output of the long-time storage device is fed back to modify the short-time storage device input.

The foregoing and other objects, features and advantages of the invention will be apparent from the following more particular description of a preferred embodiment of the invention, as illustrated in the accompanying drawings.

Figure 1:
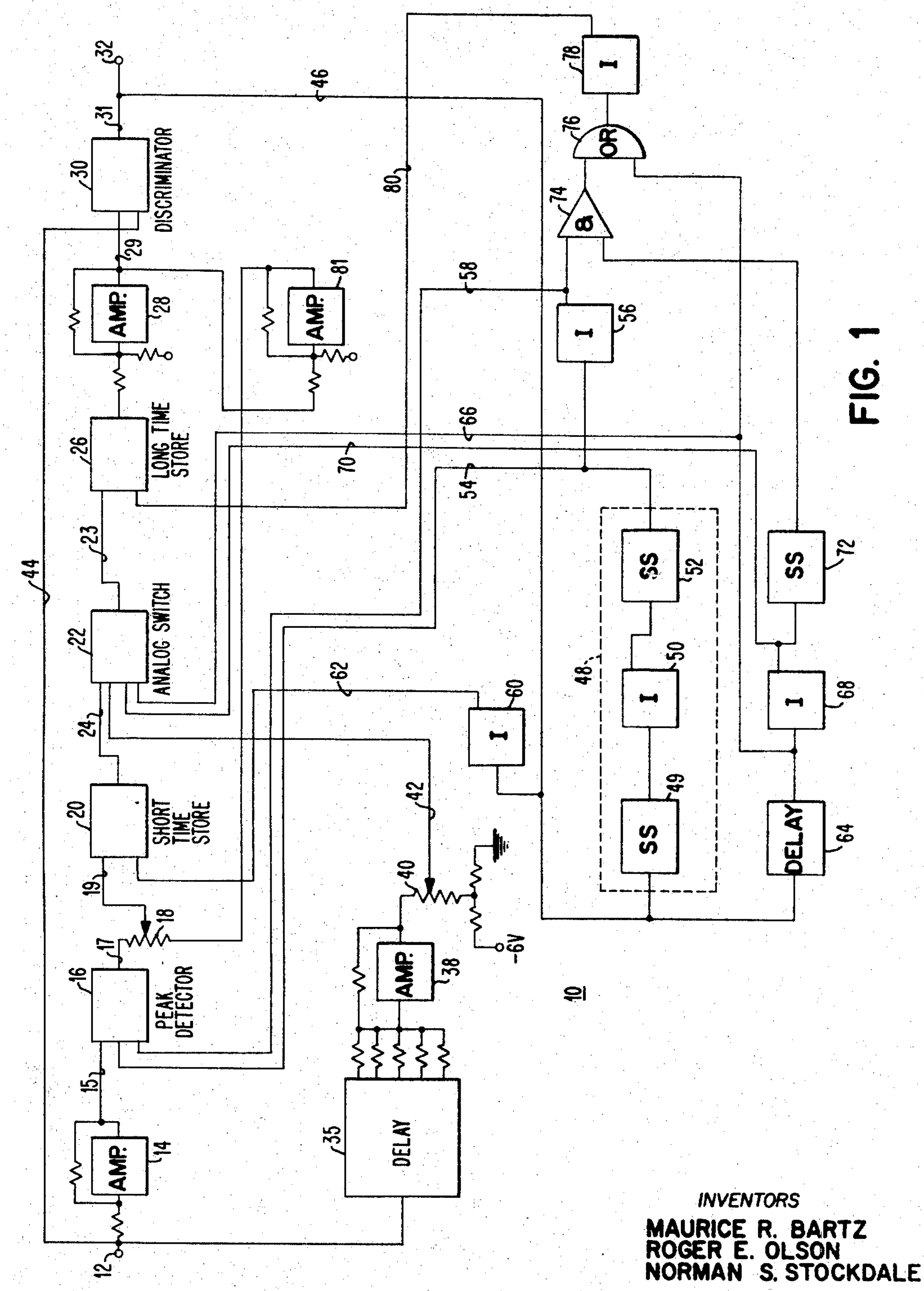
FIG. 1 is a schematic diagram of a video quantizing system for use with document scanning apparatus, and embodying the invention in one of its forms.

Referring particularly to FIG. 1, a phosphor noise corrected video signal is applied to the video quantizing system 10 at terminal 12 from whence it is applied through an operational amplifier 14 to a peak detector 16. The output of the peak detector 16 is applied through a history potentiometer 18 to a short-time store device 20, the output of which is used as one input to an analog switch 22 over conductor 24. The output of the analog switch 22 is applied to a long-time store device 26, and thence through an operational amplifier 28 to control a voltage discriminator 30 for applying an output signal to terminal 32.

At the same time, the input signal from terminal 12 is applied to a tapped delay line 35 and thence through an amplifier 38 to a potentiometer 40 whence it is compared to a D.C. voltage which is equal to the absolute black level of the video signal. The output of the potentiometer 40 is applied over conductor 42 to provide a second input for the analog switch 22. The input signal from terminal 12 is also applied over line 44 to be clipped by the level control signal in the discriminator 30.

The clipped output of the voltage discriminator 30 is applied over line 46 to a pulse generator 48 consisting of a single shot or monostable multivibrator 49, an inverter 50, and a single shot 52, for providing a reset signal over conductor 54 for the peak detector 16. The output signal from the pulse generator 48 is also applied through an inverter 56 to provide a second reset signal for the peak detector 16 over conductor 58. Inverter 60, connected to the output conductor 46, provides a digital store control signal for the short-time store device 20 over conductor 62.

The output of the voltage discriminator 30 from conductor 46 is also applied to a delay device 64 to provide one control signal for the analog switch 22 over conductor 66. The output of the delay device 64 is also applied to an inverter 68 to provide an additional control signal for the analog switch 22 over conductor 70. The output of the inverter 68 is also applied to a single shot or monostable multivibrator 72 to be anded in AND circuit 74 with the output of the inverter 56 for providing one input to the OR circuit 76, which through inverter 78 provides the store control signal for the long-time store device 26.

Figure 3:
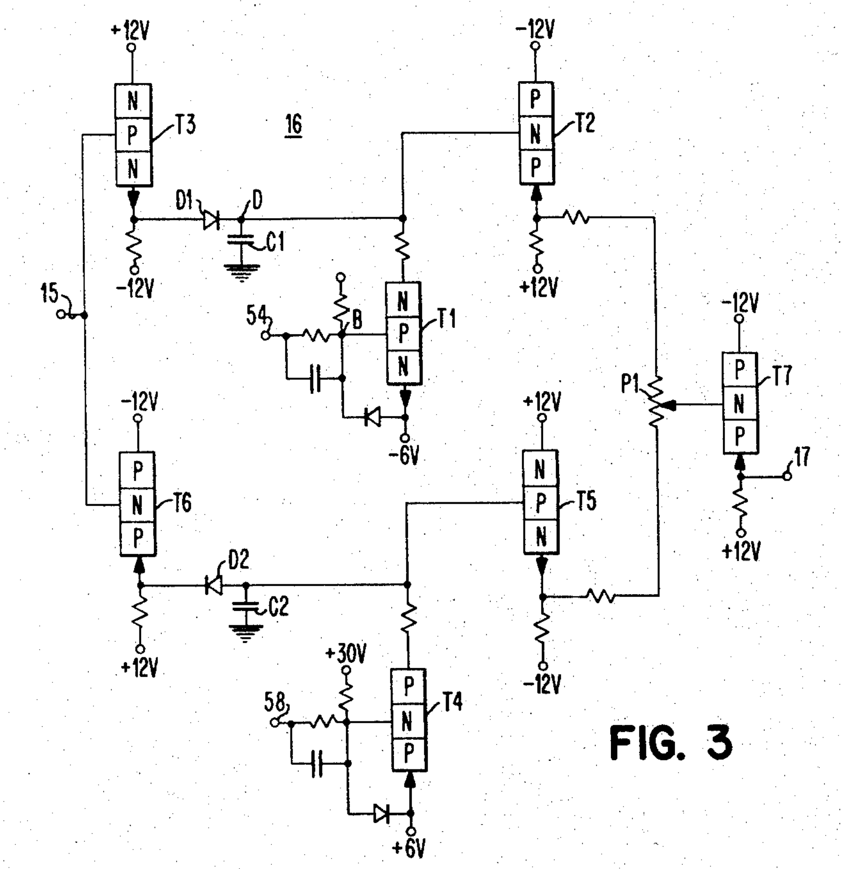
FIG. 3 is a schematic diagram of a peak detector such as used in the system of FIG. 1.

Referring to FIG. 3 it will be seen that the peak detector 16 consists of transistors T1, T2, T3 and a diode D1 making up the positive peak detector, and transistors T4, T5, T6 and diode D2 making up the negative peak detector. Since the negative peak detector works the same as the positive peak detector, the description will be provided for the positive peak detector only.

Transistor T1 will be turned on by a positive pulse applied over the reset conductor 54. This discharges capacitor C1 until diode D1 becomes forward biased. At this time the voltage of C1 at the point D would be the same as the base voltage on transistor T3 when base emitter and diode drops are neglected. Transistor T1 will then be turned off and the positive peak detector would be considered reset. As the video signal over conductor 15 reaches its most positive peak and starts downward, capacitor C1 will remain at the value of the most positive peak voltage (the value of the most negative peak would have been stored on capacitor C2). The output of transistor T2 is compared with the output of transistor T5 through potentiometer P1, the transistors T2 and T5 operating as emitter followers, and the output being taken off the emitter of transistor T7 over conductor 17.

Figure 4:
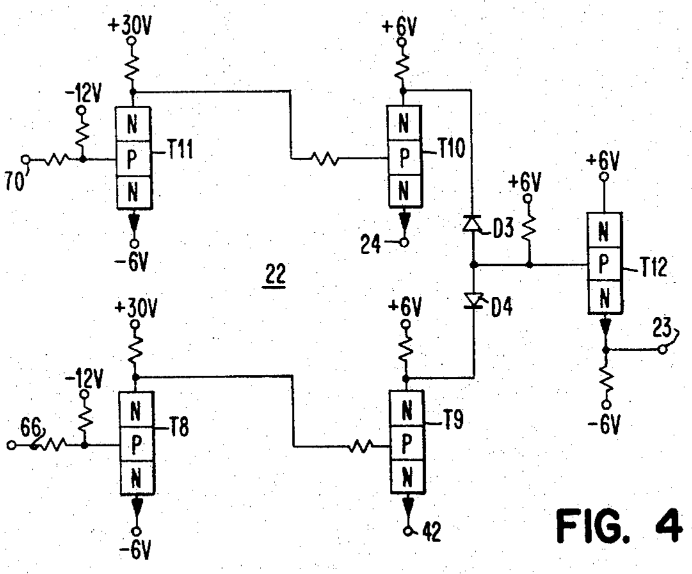
FIG. 4 is a schematic diagram of the analog switch used in the system of FIG. 1.

Referring to FIG. 4, it will be seen that the analog switch 22 provides a straight through path to conductor 23 (the output being identical to the input) for one of the two analog input signals applied to the inputs over the conductors 24 and 42, depending on the condition of the digital inputs over conductors 70 and 66. When the conductor 70 is at —6 volts, transistor T11 is turned off, allowing transistor T10 to be saturated (the analog inputs over 24 and 42 will range between +2 and —2 volts). The collector voltage on T10 is then equal to the analog signal voltage of the emitter (conductor 24), when the emitter collector drop is neglected. The input over conductor 66 is always equal to the complement of the input over conductor 70 and therefore transistor T8 is turned on. Transistor T9 is turned off, consequently blocking out the analog signal from the tapped delay line over conductor 42. At this time diode D4 is reverse biased, effectively preventing the collector voltage of transistor T9 (+6 volts) from appearing in the analog signal output. When digital input conductors 70 and 66 are opposite in polarity, the circuit performs in a similar manner but at this time the analog signal at the input conductor 42 is passed to the output through transistor T12.

Figure 5:
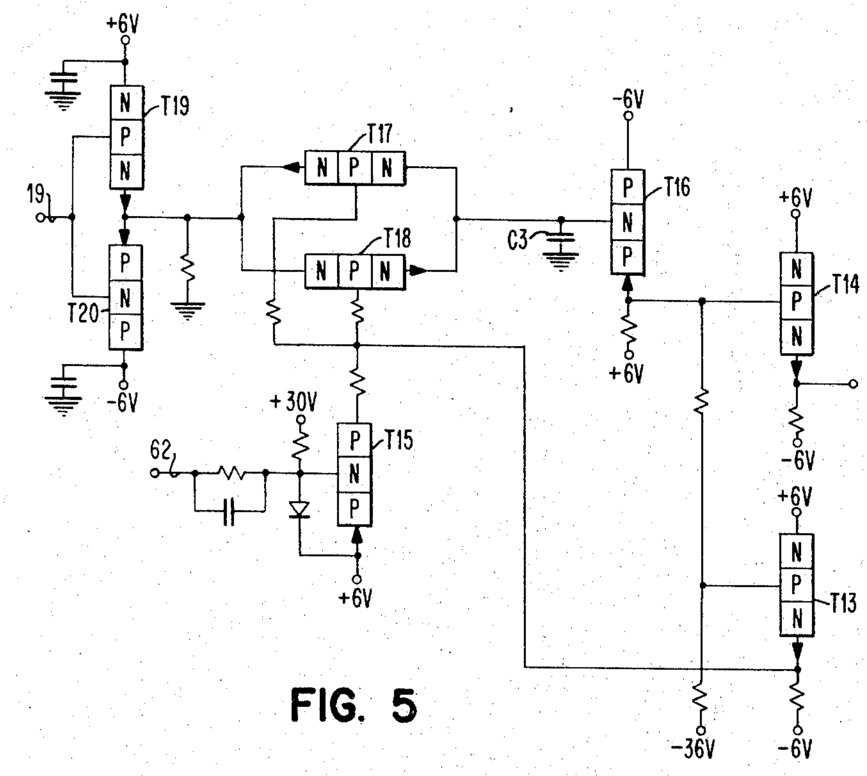
FIG. 5 is a schematic diagram representative of the circuitry used in the short-time and long-time store devices of the system of FIG. 1.

Referring to FIG. 5, a schematic diagram is shown of an analog storage circuit representative of both the short-time and the long-time store devices 20 and 26, the function of which is to store the value of the varying analog voltage at a specific instant of time. The description will be directed specifically to the short-time storage device 20. An analog signal varying between +1 and —1 volts is applied over the conductor 19 which is connected to the bases of the transistors T19 and T20. These two transistors form a complementary emitter follower. The voltage at the common point between the emitters of transistors T19 and T20 then follows the voltage of the conductor 19 at all times. When transistors T17 and T18 are turned on, the voltage of capacitor C3 will follow the voltage of the emitters of the transistors T19 and T20. The voltages at the emitters of transistors T16 and T14 will then follow the voltage of the capacitor C3 through transistors T16 and T14 which are connected as emitter followers.

When transistors T17 and T18 are turned off, the voltage that was on the capacitor C3 at the time of turn-off is held until transistors T17 and T18 are turned back on. When transistors T17 and T18 are turned on, the voltage of the capacitor C3 very quickly changes to the present value of the voltage at the emitters of the transistors T19 and T20 (the voltage at the capacitor C3 can change 2 volts in $3\times10^{-7}$ seconds).

Transistors T17 and T18 are controlled by the transistor T15. When transistor T15 is turned on, the voltage at the collector of transistor T15 is brought to +6 volts. The +6 volts at this point can supply current to transistors T17 and T18 and permits them to turn on. When transistor T15 is turned off, transistors T17 and T18 are likewise turned off. Transistor T15 is turned on by a —6 volt level at the control input over conductor 62. Transistor T15 is turned off by a +6 volt level at the control input. The function of transistor T13 is to supply a voltage to the base of transistor T18 which is proportional to the voltage of the capacitor C3. This voltage limits the swing of the bases of transistors T17 and T18 and thus decreasing the base to emitter voltage of transistors T17 and T18. The short-time store device 20 uses a capacitor C3 having a value on the order of .0085 microfarad. The long-time store device 26 is substantially identical to the short-time store device 20, with the exception that the capacitor C3 has a value of about 100 times that used in the short-time store device.

Figure 6:
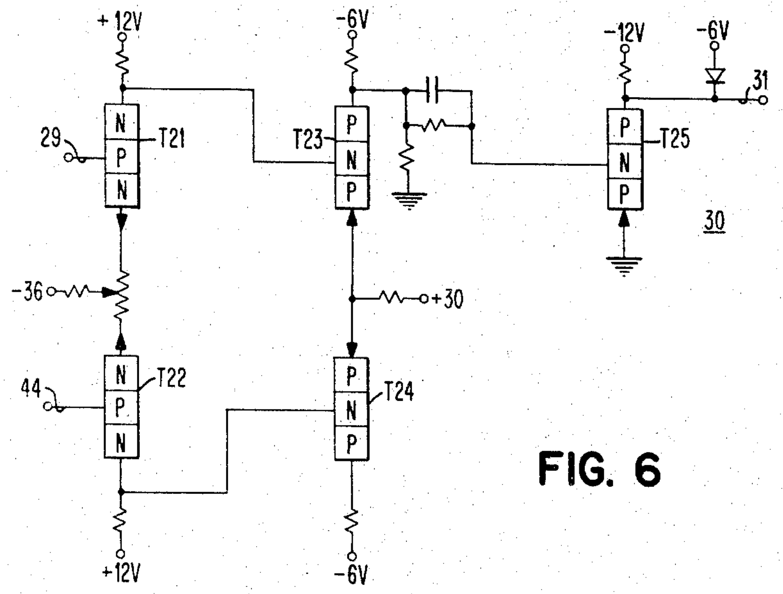
FIG. 6 is a schematic diagram of the voltage discriminator used in the system of FIG. 1.

Referring to FIG. 6 it will be seen that the voltage discriminator 30 has two inputs over conductors 29 and 44, plus a binary output over conductor 31. The output will be up if the video signal voltage at conductor 44 from the input 12 is greater than the voltage on conductor 29 from the long-time store device 26. The voltage at the output will be down if the input at conductor 44 is less than the input at conductor 29. Transistors T21, T22, T23 and T24 operate as a two stage differential amplifier, the output of which is applied to a single switching stage utilizing transistor T25.

Referring to FIG. 1, the function of the video quantizing system 10 is to detect the presence or absence of information on a document. The video signal applied to the input terminal 12 of the quantizer from the output of the phosphor noise correction circuit will be relatively free of CRT phosphor noise. A typical video waveform is shown by curve (a) in FIG. 2. For proper operation it is necessary for the quantizer circuit to set up a clipping level which represents an average level of a video signal. The clipping level is also shown by the curve (b) of FIG. 2. The video signal and the clipping level are applied to the voltage discriminator 30 which produces one of two digital voltage levels as an output, depending upon whether the video is more black or more white than the clipping level.

When the video has been white for a relatively long period of time, the tapped delay line integrator 35 is used to set up the clipping level. The video signal is supplied directly to the input of the tapped delay line 35, and the output of the taps is summed with the operational amplifier 38. The delay lines then effectively integrate any video transitions whose rise times are of the same order of magnitude as the time delay of the line. The delay line 35 should be long enough to contain 100 mils (referred to the document area) of video information. The time delay of the line is therefore dependent on the CRT spot velocity (approximately 5000 in./sec.).

The output of the summing amplifier 38 is compared to a D.C. voltage which is equal to the absolute black level of the video. A potentiometer 40 is used for this comparison, and the output of the center tap over conductor 42 is used for one of the clipping levels which is passed through the analog switch 22 and the long-time storage device 26 to the voltage discriminator 30. When there is no information present, the only video signal variations present will be due to reflectance variations of the document and system gain variations which contain only low frequency components. The tapped delay line clipping level over conductor 42 will therefore follow these signal variations as shown by the initial or upper portion of the curve (b) in FIG. 2. When the video first goes black, the signal will fall below the tapped delay line clipping level represented by the lower portion of curve (b), which causes the voltage discriminator 30 to change states. At this point the long-time storage circuit 26 stores the voltage of the clipping level at the time that the video signal entered the black. A different means of setting up the clipping level is employed while there is information present in the video signal.

Figure 2:
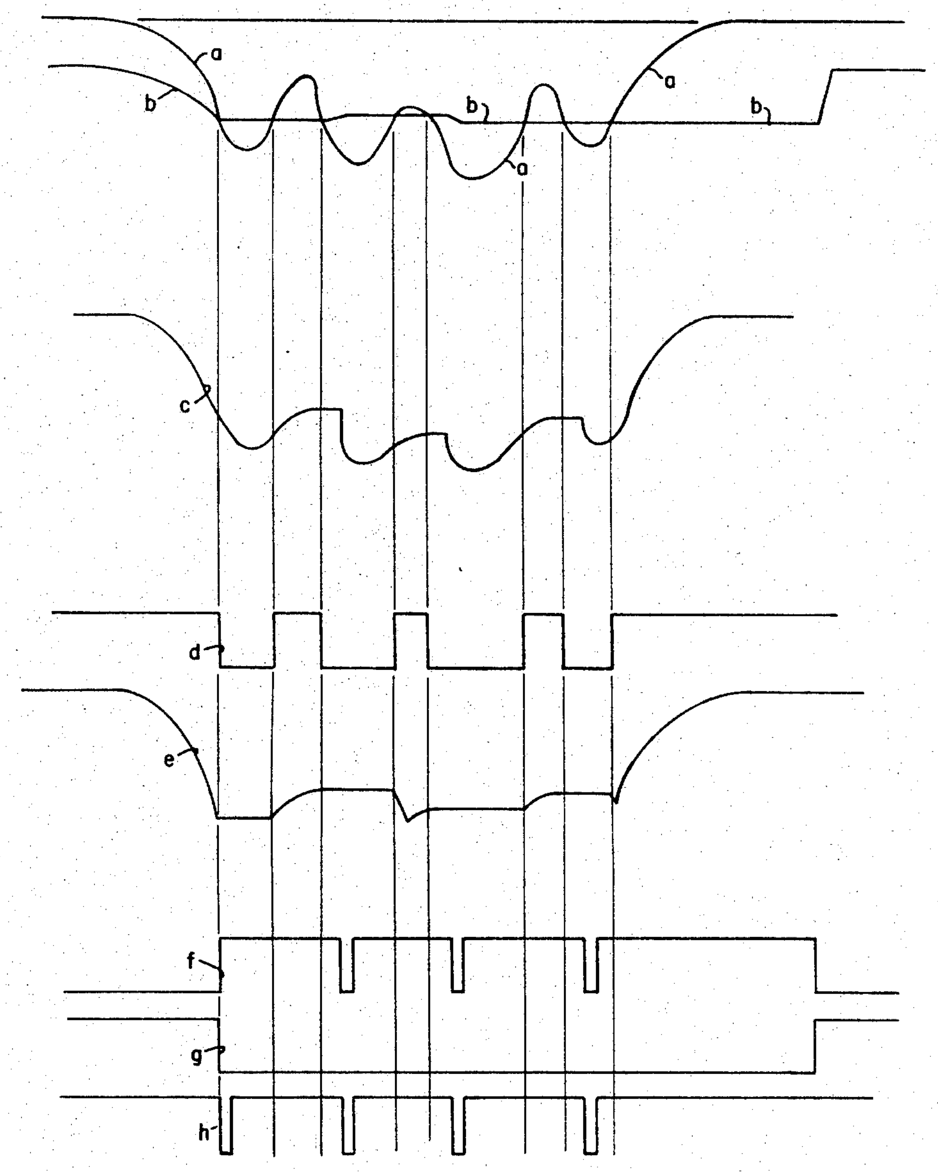
FIG. 2 illustrates a plurality of curves showing the characteristic signal levels at different points in the system of FIG. 1.

When information is present, the video signal will vary between white and black as shown by the curve (a) in FIG. 2. The black-white peak detector 16 is used to detect the value of the black and white peaks. The two values are then compared as shown in FIG. 3 by the potentiometer P1, the output of which is called the peak detected average, as taken from the center tap of this potentiometer which is set at approximately the 50% point (curve (c) FIG. 2).

The next event is to compare the new peak detected average with the old clipping level which is stored in the long-time store circuit 26. This is done by means of the history potentiometer 18, which is connected between the output conductor 17 of the peak detector 18 and the amplified output of the long-time store 26 at the amplifier 81. The center tap of the potentiometer 18 will produce a new clipping level which is stored in the long-time store 26 at a later time. Some history is introduced into the clipping level by this comparison, since the new clipping level is determined partly by the old clipping level, which in turn was determined by all past values of the peak detected average.

When the voltage discriminator 30 detects a black video signal, the output falls to a negative *y* level. The voltage discriminator output is inverted by inverter 60 and is applied to the digital store control of the short-time store circuit 20 over conductor 62. This causes the short-time store circuit 20 to hold the new clipping level while the video is black. When the voltage discriminator 30 goes negative as a result of a black video signal, the output also fires the first single shot 49 in the pulse generator block 48. The pulse which is generated in this block is used to reset the black-white peak detector 16 over conductor 54, so that it is ready to peak detect the next white and black peaks. This pulse is also used to correct the clipping level which is stored in the long-time storage device 26. It should be noted at this point that there is no useful information in the black-white peak detector output after the first white to black transition, since the peak detector 30 has not yet seen the peak value of the black signal. The pulse generated after the first white to black transition must therefore be blanked out. This blanking is accomplished by the single shot 72 and the AND circuit 74 which responds to the output of the voltage discriminator 30 over conductor 46 through the delay circuit 64 and the inverter 68, thence through OR circuit 76 and inverter 78 to the long-time storage device 26 over conductor 80. The output of the peak detector 16 is represented by the curve (c) of FIG. 2, while the voltage discriminator output is represented by the curve (d). The curve (e) represents the corresponding output signal of the short-time store device 20, while the curve (f) represents the digital input signal on conductor 80 to the long-time store device 26. The curve (g) represents the digital input on conductor 66 to the analog switch 22 while the curve (h) represents the reset signal on conductor 58 applied to the peak detector 16 during the detection of black video signals.

The width of the pulse which is generated by the pulse generator 48 is determined by the highest fundamental frequency of the video signal. The peak detector 16 must be reset as soon after a white to black transition as possible, so that the peak detector is able to detect the peak black video signal when it occurs. For optimum operation the resetting should be completed in approximately ⅛ of the shortest period of the video frequency. The long-time storage circuit 26 can be reset any time the video signal is black, since the new clipping level is being held in the short-time storage circuit 20 during this period of time. The same pulse is used to correct the long-time store circuit, however, to eliminate hardware.

From the foregoing discussion it is clear that there are two different ways of setting up the clipping level. It is therefore necessary to have the analog switch to switch between the two modes of operation. This switch 22 will transmit the analog signal applied to either of the inputs over conductors 24 or 42 depending on the polarity of the complementary digital signals applied to the control inputs over conductors 70 and 66 respectively. The switch 22 changes state immediately after the voltage discriminator 30 recognizes the presence of information on the video. The voltage discriminator 30 drives the digital control of the switch 22 through a delay circuit 64. The first white to black transition will cause a down level to appear on the output of the delay circuit 64. The output will stay down until the voltage discriminator 30 continues to detect the presence of information in the video signal. After the voltage discriminator 30 makes the last black to white transition, the delay circuit 64 will start to time out. After timing out, the output of the delay circuit 64 will return to an up level, and the switch 22 will again be in the proper state to transmit the delay line clipping level through to the voltage discriminator 30. The time out delay of the delay circuit 64 should be set long enough to insure that no more information is present on the video.

The inverter 68 provides the complementary signal which is necessary to control the analog switch 22. It also fires the single shot 72 which is used to inhibit the generated reset pulse from the digital storage control input to the long-time store circuit 26 after the first white to black transition.

When the system is in the mode of operation which uses the tapped delay line 35 to set up a clipping level, it is necessary to condition the long-time store circuit 26 digital control so that the circuit is continually storing (this effectively transmits the input to the output with a unity gain). This is accomplished by the OR circuit 76 through inverter 78, the circuit 76 being driven by the delay circuit 64. All the amplifiers shown are operational amplifiers which act as inverters and buffer stages.

While the invention has been particularly shown and described with reference to a preferred embodiment thereof, it will be understood by those skilled in the art that various changes in form and details may be made therein without departing from the spirit and scope of the invention.

What is claimed is:

1. In a quantizing system, a multi-clipping level discriminator circuit having a plurality of inputs and an output, a peak detector circuit having an input and an output, a tapped delay line having an input and an output, circuit means for applying a video signal to one input each of the discriminator circuit, the peak detector circuit, and the tapped delay line, and switch means selectively operable to connect the outputs of the delay line and the peak detector to another input of the discriminator cricuit to vary the clipping level of the discriminator from one level to another.

2. A video scanner quantizing system comprising, a multi-clipping level voltage discriminator having clipping level and video signal inputs, and a quantized output, a tapped delay line having a video signal input and an integrated signal output, a peak detector having a video signal input and an output, and means including a switch operable to selectively connect the delay line and the peak detector outputs to the clipping level input of the discriminator.

3. In a video scanner quantizing system, a multi-clipping level voltage discriminator having video signal and clipping level inputs and a quantized signal output, a means for controlling the clipping level input including a switch having an output connected to apply a signal to the discriminator clipping level input and having a plurality of inputs, a tapped delay line having a video signal input and an output connected to one of the switch inputs, a peak detector having a video signal input and an output, and a short-time storage circuit connecting the peak detector output to another one of the switch inputs.

4. A video scanner quantizing system comprising, a voltage discriminator having clipping level and video signal inputs and a quantized signal output, a long-time storage device having an input, and an output connected to the discriminator clipping level input, a peak detector having a video signal input and an output, a tapped delay line having a video signal input and an output, and means including an analog switch selectively operable to connect one or the other of the detector and delay line outputs to the long-time storage device input.

5. In a video scanner quantizing system, a voltage discriminator having clipping level and video signal inputs and a quantized signal output, a peak detector circuit having a video signal input and an output, a tapped delay line having a video signal input and an output, analog switch means operable to selectively connect the peak detector and delay line outputs to the discriminator clipping level input, and circuit means including delay means and a monostable multivibrator responsive to the signal output of the discriminator for effecting selective control of said switch means.

6. In a video scanner quantizing system, a voltage discriminator having clipping level and video signal inputs, and an output, a peak detector having a video signal input and an output, a tapped delay line having a video signal input and an output, switch means selectively operable to connect either the detector output or the delay line output to the clipping level input of the discriminator, and circuit means including a delay device and an inverter connecting the switch means and the output of the discriminator for effecting selective operation of the switch means.

7. In a quantizing system for a video scanner, a voltage discriminator having video signal and clipping level inputs and having a quantized output, a peak detector having video signal and reset signal inputs and having an output, a tapped delay line having a video signal input and an integrated output, switch means selectively operable to connect one of the delay line and one of the peak detector outputs to the discriminator clipping level input, and circuit means including a pulse generator connected between the discriminator output and the peak detector reset input for resetting the peak detector in response to the discriminator output.

8. In a quantizing system for a video signal scanner, a voltage discriminator having clipping level and video signal inputs and a quantized signal output, a tapped delay line having a video signal input and an integrated signal output, a peak detector having video signal and reset signal inputs and having an output, analog switch means having a plurality of inputs including a control input and inputs connected to each the peak detector and tapped delay line outputs and having an output for connecting one of said inputs to the discriminator clipping level input, circuit means including a delay device connected between the discriminator output and the switch control input for effecting selective operation of the switch means, and other circuit means including a pulse generator connecting the discriminator output and the peak detector reset input.

9. In a quantizing system, a multi-voltage clipping level discriminator having video signal and clipping level inputs and an output, a peak detector having a video signal input and an output, a tapped delay line having a video signal input and an output, switch means having a plurality of inputs, an output and at least one control input for controlling the connection of the output to one or the other of the inputs, short-time delay means connecting the peak detector output to one of the switch inputs, means including a voltage divider connecting the delay line output to another of the switch inputs, a long-time delay device connecting the output of the switch device to the clipping level input of the discriminator, and circuit means including a delay device connecting said control input to the discriminator output.

10. In a multi-clipping level video signal quantizing system, a voltage discriminator having clipping level and video signal inputs for producing a quantized signal at an output, a peak detector having a video signal input and an output, a tapped delay line having a video signal input and an integrated signal output, switch means having a pair of inputs, an output and control means for selectively connecting one of said inputs to said output, long-time storage means connecting the switch output to the discriminator clipping level input, means including a voltage divider connecting the delay line output to one of the switch inputs, means including a short-time storage device connecting the peak detector output to the other of the switch inputs, and circuit means including a delay device and an inverter (a monostable multivibrator) connecting the discriminator output to the switch control means for selectively connecting the switch output to said switch inputs in accordance with the discriminator output signal.

References Cited

UNITED STATES PATENTS

| | | | |
|---|---|---|---|
| 2,975,371 | 3/1961 | Greanias | 328—168 |
| 3,339,178 | 8/1967 | Hardin | 340—146.3 |

ROBERT L. GRIFFIN, *Primary Examiner.*

R. L. RICHARDSON, *Assistant Examiner.*

U.S. Cl. X.R.

340—146.3; 328—147, 151, 169